(12) United States Patent
Rubinoff (10) Patent No.: US 11,531,668 B2
(45) Date of Patent: Dec. 20, 2022

(54) MERGING OF MULTIPLE DATA SETS

(75) Inventor: Robert Rubinoff, Potomac, MD (US)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

(21) Appl. No.: 12/344,713

(22) Filed: Dec. 29, 2008

(65) Prior Publication Data

US 2010/0169385 A1 Jul. 1, 2010

(51) Int. Cl.
*G06F 16/23* (2019.01)
*G06F 16/78* (2019.01)

(52) U.S. Cl.
CPC ...... *G06F 16/2365* (2019.01); *G06F 16/7867* (2019.01)

(58) Field of Classification Search
CPC .................. G06F 16/2365; G06F 16/7867
USPC ........ 707/803, 690, 748; 725/46; 706/12, 54
See application file for complete search history.

(56) References Cited

U.S. PATENT DOCUMENTS

| | | |
|---|---|---|
| 4,227,177 A | 10/1980 | Moshier |
| 5,493,677 A | 2/1996 | Balogh et al. |
| 5,521,841 A | 5/1996 | Farshid et al. |
| 5,530,859 A | 6/1996 | Tobias, II et al. |
| 5,535,063 A | 7/1996 | Lamming |
| 5,553,281 A | 9/1996 | Brown et al. |
| 5,576,755 A | 11/1996 | Davis et al. |
| 5,594,897 A | 1/1997 | Goffman |
| 5,640,553 A | 6/1997 | Schultz |
| 5,649,182 A | 7/1997 | Reitz |
| 5,666,528 A | 9/1997 | Thai |
| 5,682,326 A | 10/1997 | Klingler et al. |
| 5,717,914 A | 2/1998 | Husick et al. |
| 5,729,741 A | 3/1998 | Liaguno et al. |
| 5,737,495 A | 4/1998 | Adams et al. |
| 5,737,734 A | 4/1998 | Schultz |
| 5,742,816 A | 4/1998 | Barr et al. |
| 5,761,655 A | 6/1998 | Hoffman |
| 5,765,150 A | 6/1998 | Burrows |
| 5,799,315 A | 8/1998 | Rainey et al. |
| 5,819,292 A | 10/1998 | Hitz et al. |

(Continued)

FOREIGN PATENT DOCUMENTS

| | | |
|---|---|---|
| CA | 2685833 A1 | 5/2010 |
| EP | 1241587 A1 | 9/2002 |
| EP | 1462950 A1 | 9/2004 |

(Continued)

OTHER PUBLICATIONS

International Search Report and Written Opinion for PCT/US09/69644, dated Mar. 4, 2010.

(Continued)

*Primary Examiner* — Huawen A Peng
(74) *Attorney, Agent, or Firm* — Banner & Witcoff, Ltd.

(57) ABSTRACT

A method may comprise comparing a first data set with a second data set, the first data set associating a first plurality of names with a first plurality of roles, and the second data set associating a second plurality of names with a second plurality of roles. The method may further comprise generating a third data set based on an outcome of the comparing, such that the third data set associates a subset of the first plurality of names with a subset of the second plurality of roles. Apparatuses, methods, and software for performing these and other functions are also described.

30 Claims, 5 Drawing Sheets

(56) References Cited

U.S. PATENT DOCUMENTS

| | | |
|---|---|---|
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,937,422 A | 8/1999 | Nelson et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,167,377 A | 12/2000 | Gillick et al. |
| 6,188,976 B1 | 2/2001 | Ramaswamy et al. |
| 6,278,992 B1 | 8/2001 | Curtis et al. |
| 6,320,588 B1 | 11/2001 | Palmer et al. |
| 6,343,294 B1 | 1/2002 | Hawley |
| 6,345,253 B1 | 2/2002 | Viswanathan |
| 6,363,380 B1 | 3/2002 | Dimitrova |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1 | 4/2003 | Flannery et al. |
| 6,546,385 B1 | 4/2003 | Mao et al. |
| 6,567,980 B1 | 5/2003 | Jain et al. |
| 6,580,437 B1 | 6/2003 | Liou et al. |
| 6,675,174 B1 | 1/2004 | Bolle et al. |
| 6,698,020 B1 | 2/2004 | Zigmond et al. |
| 6,771,875 B1 | 8/2004 | Kunieda et al. |
| 6,789,088 B1 | 9/2004 | Lee et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1 | 11/2005 | McGrath et al. |
| 7,155,392 B2 | 12/2006 | Schmid et al. |
| 7,177,861 B2 | 2/2007 | Tovinkere et al. |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 * | 6/2009 | Platt et al. |
| 7,584,102 B2 | 9/2009 | Hwang et al. |
| 7,596,549 B1 | 9/2009 | Issa et al. |
| 7,739,286 B2 | 6/2010 | Sethy et al. |
| 7,788,266 B2 | 8/2010 | Venkataraman et al. |
| 7,792,812 B1 | 9/2010 | Carr |
| 7,814,267 B1 | 10/2010 | Iyengar et al. |
| 7,921,116 B2 | 4/2011 | Finkelstein et al. |
| 7,925,506 B2 | 4/2011 | Farmaner et al. |
| 7,958,119 B2 | 6/2011 | Eggink et al. |
| 7,983,902 B2 | 7/2011 | Wu et al. |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 8,468,083 B1 | 6/2013 | Szulczewski |
| 8,527,520 B2 | 9/2013 | Morton et al. |
| 8,572,087 B1 | 10/2013 | Yagnik |
| 8,909,655 B1 | 12/2014 | McDonnell |
| 2001/0014891 A1 | 8/2001 | Hoffert et al. |
| 2002/0035573 A1 | 3/2002 | Black et al. |
| 2002/0087315 A1 | 7/2002 | Lee et al. |
| 2002/0091837 A1 | 7/2002 | Baumeister et al. |
| 2002/0143774 A1 | 10/2002 | Vandersluis |
| 2002/0194181 A1 | 12/2002 | Wachtel |
| 2003/0014758 A1 | 1/2003 | Kim |
| 2003/0033297 A1 | 2/2003 | Ogawa |
| 2003/0050778 A1 | 3/2003 | Nguyen et al. |
| 2003/0061028 A1 | 3/2003 | Dey et al. |
| 2003/0093790 A1 | 5/2003 | Logan et al. |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2003/0204513 A1 | 10/2003 | Bumbulis |
| 2004/0111465 A1 | 6/2004 | Chuang et al. |
| 2004/0117831 A1 | 6/2004 | Ellis et al. |
| 2004/0139091 A1 | 7/2004 | Shin |
| 2004/0215634 A1 | 10/2004 | Wakefield et al. |
| 2004/0225667 A1 | 11/2004 | Hu et al. |
| 2004/0243539 A1 | 12/2004 | Skurtovich et al. |
| 2004/0254795 A1 | 12/2004 | Fujii et al. |
| 2004/0267700 A1 | 12/2004 | Dumais et al. |
| 2005/0044105 A1 | 2/2005 | Terrell |
| 2005/0060647 A1 | 3/2005 | Doan et al. |
| 2005/0091443 A1 | 4/2005 | Hershkovich et al. |
| 2005/0097138 A1 | 5/2005 | Kaiser et al. |
| 2005/0114130 A1 | 5/2005 | Java et al. |
| 2005/0124320 A1 * | 6/2005 | Ernst ................ H04M 3/4931 455/411 |
| 2005/0152362 A1 * | 7/2005 | Wu .............. 370/389 |
| 2005/0193005 A1 | 9/2005 | Gates et al. |
| 2005/0222975 A1 | 10/2005 | Nayak et al. |
| 2006/0004738 A1 * | 1/2006 | Blackwell ............ G06F 9/4448 |
| 2006/0037046 A1 * | 2/2006 | Simms et al. .................. 725/56 |
| 2006/0074671 A1 | 4/2006 | Farmaner et al. |
| 2006/0085406 A1 * | 4/2006 | Evans ................ G06F 16/258 |
| 2006/0088276 A1 * | 4/2006 | Cho ...................... H04H 60/73 386/230 |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck Sibley et al. |
| 2006/0184495 A1 | 8/2006 | Crosby et al. |
| 2006/0212288 A1 | 9/2006 | Sethy et al. |
| 2006/0235843 A1 | 10/2006 | Musgrove et al. |
| 2006/0253780 A1 | 11/2006 | Munetsugu et al. |
| 2006/0256739 A1 * | 11/2006 | Seier et al. .................. 370/261 |
| 2007/0011133 A1 | 1/2007 | Chang |
| 2007/0050343 A1 | 3/2007 | Siddarampappa et al. |
| 2007/0050366 A1 | 3/2007 | Bugir et al. |
| 2007/0067285 A1 | 3/2007 | Blume et al. |
| 2007/0078708 A1 | 4/2007 | Yu et al. |
| 2007/0083374 A1 | 4/2007 | Bates et al. |
| 2007/0156677 A1 | 7/2007 | Szabo |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0233656 A1 | 10/2007 | Bunescu et al. |
| 2007/0233671 A1 | 10/2007 | Oztekin et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0033915 A1 | 2/2008 | Chen et al. |
| 2008/0046929 A1 * | 2/2008 | Cho et al. ......................... 725/46 |
| 2008/0059418 A1 | 3/2008 | Barsness et al. |
| 2008/0091633 A1 | 4/2008 | Rappaport et al. |
| 2008/0118153 A1 | 5/2008 | Wu et al. |
| 2008/0133504 A1 | 6/2008 | Messer et al. |
| 2008/0147650 A1 * | 6/2008 | Marsh ................ G06F 16/48 |
| 2008/0162533 A1 | 7/2008 | Mount et al. |
| 2008/0163328 A1 | 7/2008 | Philbin et al. |
| 2008/0168045 A1 | 7/2008 | Suponau et al. |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1 | 9/2008 | Matheny |
| 2008/0222106 A1 | 9/2008 | Rao et al. |
| 2008/0222142 A1 | 9/2008 | O'Donnell |
| 2008/0235209 A1 | 9/2008 | Rathod et al. |
| 2008/0235393 A1 | 9/2008 | Kunjithapatham et al. |

(56) References Cited

U.S. PATENT DOCUMENTS

| | | |
|---|---|---|
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2008/0319962 A1 | 12/2008 | Riezler et al. |
| 2009/0006315 A1 | 1/2009 | Mukherjea et al. |
| 2009/0006391 A1 | 1/2009 | Ram |
| 2009/0013002 A1 | 1/2009 | Eggink et al. |
| 2009/0025054 A1 | 1/2009 | Gibbs et al. |
| 2009/0055381 A1 | 2/2009 | Wu et al. |
| 2009/0077078 A1* | 3/2009 | Uppala ............... G06F 7/32 |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0131028 A1* | 5/2009 | Horodezky ..... H04M 1/274516 455/418 |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1* | 7/2009 | Tsui et al. ............... 715/721 |
| 2009/0198686 A1 | 8/2009 | Cushman, II et al. |
| 2009/0204599 A1 | 8/2009 | Morris et al. |
| 2009/0205018 A1* | 8/2009 | Ferraiolo et al. .......... 726/1 |
| 2009/0240650 A1 | 9/2009 | Wang et al. |
| 2009/0240674 A1* | 9/2009 | Wilde et al. ............... 707/4 |
| 2009/0271195 A1 | 10/2009 | Kitade et al. |
| 2009/0279682 A1* | 11/2009 | Strandell ............ H04L 63/18 379/201.02 |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0063886 A1* | 3/2010 | Stratton ............. G06Q 30/00 705/14.73 |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich, Jr. et al. |
| 2012/0150636 A1 | 6/2012 | Freeman et al. |
| 2012/0191695 A1 | 7/2012 | Xia |
| 2012/0203708 A1* | 8/2012 | Psota ............... G06Q 30/06 705/347 |
| 2013/0054589 A1 | 2/2013 | Cheslow |
| 2013/0216207 A1* | 8/2013 | Berry ............... H04N 5/76 386/282 |

FOREIGN PATENT DOCUMENTS

| | | | |
|---|---|---|---|
| EP | 1501305 | A1 | 1/2005 |
| GB | 244875 | A | 12/1925 |
| GB | 2448874 | A | 11/2008 |
| WO | 9950830 | A1 | 10/1999 |
| WO | 0205135 | A2 | 1/2002 |
| WO | 2005/050621 | A2 | 6/2005 |
| WO | 2006099621 | A2 | 9/2006 |
| WO | 2007115224 | A2 | 10/2007 |
| WO | 2008053132 | A1 | 5/2008 |
| WO | 2009052277 | A1 | 4/2009 |
| WO | 2010100853 | A1 | 9/2010 |

OTHER PUBLICATIONS

Messer, Alan et al., "SeeNSearch: A Context Directed Search Facilitator for Home Entertainment Devices", Paper, Feb. 9, 2008, Samsung Information Systems America Inc., San Jose, CA.

Kontothoanassis, Ledonias et al. "Design, Implementation, and Analysis of a Multimedia Indexing and Delivery Server", Technical Report Series, Aug. 1999, Cambridge Research Laboratory.

Smith, J.R. et al. "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

IPER PCT/US2009/069644—Jun. 29, 2011.

ISR PCT/US2009/069644—Mar. 4, 2010.

ESR—EP10154725.5—Nov. 2, 2010.

ESR—EP10155340.2—Nov. 25, 2010.

Partial ESR—EP10155340.2—Jul. 12, 2010.

ESR—EP10162666.1—Aug. 4, 2011.

ESR—EP10167947.0—Sep. 28, 2010.

Shahraray: "Impact and Applications of Video Content Analysis and Coding in the internet and Telecommunications", AT&T Labs Research, A Position Statement for Panel 4: Applications the 1998 International Workshop on Very Low Bitrate Video Coding, 3 pages.

Kalina Bontcheva et al "Shallow Methods for Named Entity Coreference Resolution", Proc. of Tain 2002, Jan. 1, 2002.

Raphael Volz et al., "Towards ontologybased disambiguation of geographical identifiers", Proceedings of the WWW2007 Workshop I3: Identity, Identifiers, Identification, Entity-Centric Approaches to Information and Knowledge Management on the Web, Jan. 1, 2007.

Wacholder N et al., "Disambiguation of Proper Names in Text", Proceedings of the Conference on Applied Natural Language Processing, Association Computer Linguistics, Morrisontown, NJ, Mar. 1, 2007.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Steffen Staab et al., "Semantic Multimedia", Reasoning Web; Lecture Notes in Computer Science, pp. 125-170, Sep. 2008.

European Search Report EP09179987.4, dated Jun. 4, 2010.

Li, Y. et al., "Reliable Video Clock Time Recognition," Pattern Recognition, 2006, 1CPR 1006, 18th International Conference on Pattern Recognition, 4 pages.

Salton et al., Computer Evaluation of Indexing and Text Processing Journal of the Association for Computing Machinery, vol. 15, No. 1, Jan. 1968, pp. 8-36.

European Search Report for Application No. 09180776.8, dated Jun. 7, 2010, 9 pages.

European Search Report EP 09180762, dated Mar. 22, 2010.

European Application No. 09175979.5—Office Action dated Mar. 15, 2010.

EP Application No. 09 175 979.5—Office Action dated Apr. 11, 2011.

European Patent Application No. 09175979.5—Office Action dated Dec. 13, 2011.

International Preliminary Examination Report for PCT/US01/20894, dated Feb. 4, 2002.

Towards a Multimedia World-Wide Web Information retrieval engines, Sougata Mukherjea, Kyoji Hirata, and Yoshinori Hara Computer Networks and ISDN Systems 29 (1997) 1181-1191.

Experiments in Spoken Document Retrieval at CMU, M.A. Siegler, M.J. Wittbrock, S.T. Slattery, K. Seymore, R.E. Jones, and A.G. Hauptmann, School of Computer Science Carnegie Mellon University, Pittsburgh, PA 15213-3890, Justsystem Pittsburgh Research Center, 4616 Henry Street, Pittsburgh, PA 15213.

Eberman, et al., "Indexing Multimedia for the Internet", Compaq, Cambridge Research laboratory, Mar. 1999, pp. 1-8 and Abstract.

(56) References Cited

OTHER PUBLICATIONS

Ishitani, et al., "Logical Structure Analysis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Hsin-Min Wang and Berlin Chen, "Content-based Language Models for Spoken Document Retrieval", ACM, 2000, pp. 149-155.
Marin, Feldman, Ostendorf and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, dated Sep. 28, 2010.
"Ying Zhang and Phil Vines. 2004. Using the web for automated translation extraction in cross-language information retrieval. In Proceedings of the 27th annual international ACM SIGIR conference on Research and development in information retrieval (SIGIR '04). ACM, New York, NY, USA, 162-169".
Extended European Search Report—EP 09815446.1—dated May 7, 2013.
Canadian Patent Application No. 2,685,833—Office Action dated Jan. 20, 2012.
European Office Action—EP 10154725.5—dated Apr. 24, 2015.
Response to European Office Action—EP Appl. 9180762.8—Submitted Jul. 29, 2015.
European Office Action—EP Appl. 10162666.1—dated Jul. 10, 2015.
Chen, Langzhou, et al. "Using information retrieval methods for language model adaptation." Interspeech. 2001.
Sethy, Abhinav, Panayiotis G. Georgiou, and Shrikanth Narayanan. "Building topic specific language models from webdata using competitive models." Interspeech. 2005.
Behrang Mohit and Rebecca Hwa, 2005. Syntax-based Semi-Supervised Named Entity Tagging. In Proceedings of the ACL Interactive Poster and Demonstration Sessions, pp. 57-60.
Shumeet Baluja, Vibhu Mittal and Rahul Sukthankar, 1999. Applying machine learning for high performance named-entity extraction. In Proceedings of Pacific Association for Computational Linguistics.
R. Bunescu and M. Pasca. 2006. Using encyclopedic knowledge for named entity disambiguation. In Proceedings of EACL—2006, pp. 9-16.
S. Cucerzan. 2007. Large-Scale Named Entity Disambiguation Based on Wikipedia Data. In Proceedings of EMNLP-CoNLL 2007, pp. 708-716.
Radu Florian, 2002. Named entity recognition as a house of cards: Classifier stacking. In Proceedings of CoNL2002, pp. 175-178.
Martin Jansche, 2002. Named Entity Extraction with Conditional Markov Models and Classifiers. In Proceedings of CoNLL-2002.
Thamar Solorio, 2004. Improvement of Named Entity Tagging by Machine Learning. Reporte Tecnico No. CCC-04-004. INAOE.
Canadian Office Action—CA Application 2,697,565—dated Dec. 15, 2015.
Response to European Office Action—EP 10162666.1—dated Oct. 14, 2015.
Response to European Office Action—EP Appl. 10154725.5—submitted Oct. 14, 2015.
Canadian Office Action—CA Appl. 2,694,943—dated Jun. 1, 2016.
European Office Action—EP Appl. 09815446.1—dated Feb. 17, 2016.
Canadian Office Action—CA Appl. 2,703,569—dated Apr. 19, 2016.
Canadian Office Action—CA Appl. 2,708,842—dated May 9, 2016.
Canadian Office Action—CA Appl. 2,688,921—dated Feb. 16, 2016.
Canadian Office Action—Ca App 2,695,709—dated Jun. 20, 2016.
Canadian Office Action—CA Appl. 2,689,376—dated Feb. 23, 2016.
Canadian Office Action—CA Appl. 2,708,842—dated Apr. 12, 2017.
Arthur De Vany, W. David Walls, "Uncertainty in the Movie Industry: Does Star Power Reduce the Terror of the Box Office?," Journal of Cultural Economics, 1999, pp. 285-318, Issue 23, Kluwer Academic Publishers, Netherlands.
Oct. 6, 2017—European Decision to Refuse—EP 09180762.8.
Oct. 25, 2017—European Decision to Refuse—EP 09815446.1.
Mar. 21, 2017—Canadian Office Action—CA App. 2,694,943.
Canadian Office Action—CA Appl. 2,703,569—dated Feb. 8, 2017.
Canadian Office Action—CA App 2,697,565—dated Dec. 28, 2016.
Nov. 28, 2017—European Decision to Refuse—EP 10162666.1.
Dec. 15, 2017—Canadian Office Action—CA 2689376.
Feb. 2, 2018—Canadian Office Action—CA 2,708,842.
Feb. 15, 2018—Canadian Office Action—CA 2,697,565.
Mar. 21, 2018—Canadian Office Action—CA 2,694,943.
Feb. 28, 2018—Canadian Office Action—2,703,569.
Dec. 17, 2018—Canadian Office Action—CA 2,708,842.
Mar. 28, 2019—Canadian Office Action—CA 2,703,569.
Nov. 15, 2019—Canadian Office Action—CA 2,708,842.
Apr. 29, 2021—Canadian Office Action—CA 2,703,569.
May 27, 2022—CA Office Action—CA App. No. 2,703,569.

* cited by examiner

Data Set 1

Data Set 2

Fig. 3

Data Set 1

Data Set 2

MERGING OF MULTIPLE DATA SETS

BACKGROUND

Electronic television program guides typically allow the viewer to display information about particular television shows, such as the names of the actors and directors involved in the television shows, as well as their roles. What the viewer may not realize is that the process of collecting this information can be extremely inefficient; it can be time-consuming and expensive. Moreover, much of the process typically requires a considerable amount of human involvement to ensure that the information is relatively accurate.

One reason that the information collection process is so inefficient is that the information often contains inaccuracies, and may exclude certain information altogether. Examples of well-known sources of such information include Internet Movie Database (IMDB) (www.imdb.com), All Movie Guide (AMG) (www.allmovie.com), and Tribune Media Services (TMS).

What is needed is a way to collect and merge information, such as television show information, from multiple sources, while maintaining a reasonable degree of accuracy.

SUMMARY

Aspects as described herein are directed to merging data from two or more sources to produce a merged set of data. For instance, in the context of television show information, references to the same person may be matched between sources where the person is indicated as having the same relationship with a television show (e.g., indicated as being an actor in a particular television show). Then, the most reliable biographical information may be chosen from amongst the sources, and associated with the person. In some cases, the matching process may produce ambiguous results, which may trigger special handling. By merging two or more of source data sets together, the merged data set may potentially be more complete, and contain fewer inaccuracies, than any one of the source data sets taken individually.

Further aspects are directed to comparing a first data set with a second data set, the first data set associating a first plurality of names with a first plurality of roles, and the second data set associating a second plurality of names with a second plurality of roles; and generating a third data set based on an outcome of the comparing, such that the third data set associates a subset of the first plurality of names with a subset of the second plurality of roles.

Still further aspects are directed to receiving a first data set representing relationships between a first plurality of names with a first plurality of events, and associating the first plurality of names with a plurality of first identifiers; receiving a second data set representing relationships between a second plurality of names with a second plurality of events, and associating the second plurality of names with a plurality of second identifiers; for each of the plurality of first identifiers, associating a third identifier with the first identifier; determining a subset of the relationships of the second data set that each corresponds to at least one of the relationships of the first data set; for each of the subset of relationships of the second data set, associating the second identifier of the name that is part of that relationship of the second data set with the third identifier of the name in the at least one corresponding relationship of the first data set; and generating a third data set representing the associations between the first and third identifiers and the associations between the second and third identifiers.

Yet further aspects are directed to receiving a first data set representing relationships between a first plurality of names with a first plurality of events, associating the first plurality of names with a plurality of first identifiers; receiving a second data set representing relationships between a second plurality of names with a second plurality of events; and for each of at least some of the relationships of the second data set, performing only one of the following depending upon the relationships of the first data set: associating the relationship of the second data set with one of the first identifiers, or associating the relationship of the second data set with a second identifier. In addition, a third data set may be generated representing the associations between the relationships of the second data set with the first and second identifiers.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
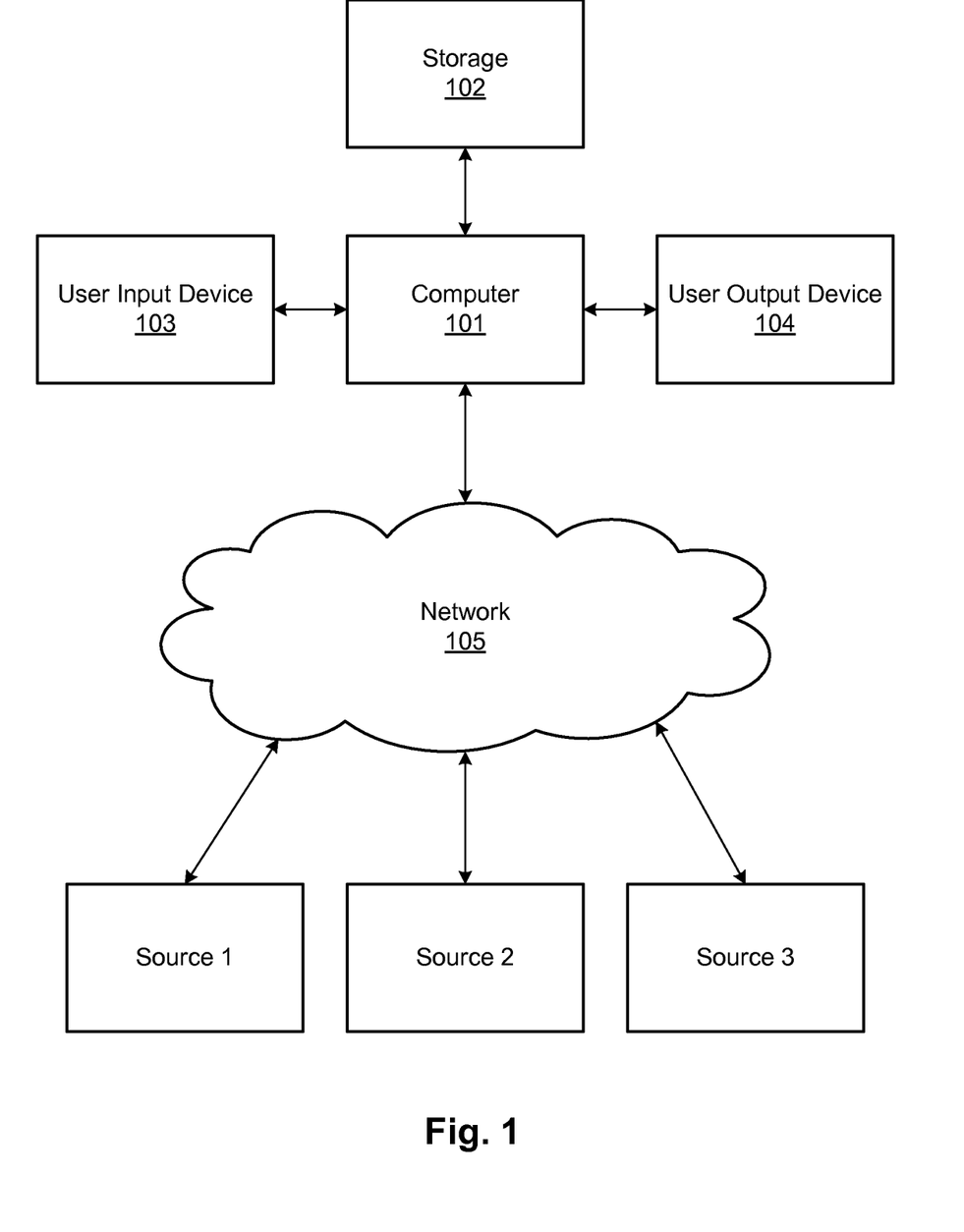
FIG. 1 is a functional block diagram of an illustrative system that may be used for performing various functions related to merging data from multiple data sets.

FIG. 1 is a functional block diagram of an illustrative system that may be used for performing various functions related to merging multiple data sets. In this example, the system includes a computer 101, storage 102, a user input device 103, a user output device 104, a network 105, Source 1, Source 2, and Source 3.

A "computer" as referred to herein (such as computer 101) broadly includes any electronic, electro-optical, and/or mechanical device, or system of physically separate such devices, that is able to process and manipulate information, such as in the form of data. Non-limiting examples of a computer include one or more personal computers (e.g., desktop or laptop), servers, personal digital assistants (PDAs), and/or a system of these in any combination or subcombination. In addition, a given computer may be physically located completely in one location or may be distributed amongst a plurality of locations (i.e., may implement distributive computing).

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to a computer as described herein may be implemented by the computer, such as by reading and executing such computer-readable instructions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives.

Such a computer-readable medium may store computer-readable instructions (e.g., software) and/or computer-readable data (i.e., information that may or may not be executable). In the present example, storage 102 may be or include such a computer-readable medium, and may store computer-executable instructions and/or data used by computer 101. While storage 102 is functionally shown in FIG. 1 as separate from computer 101, storage 102 may be physically integrated with computer 101, physically separate from computer 101, or both (such as where storage 102 comprises multiple media).

User input device 103 may be used for receiving user input from a human and providing an indication of the user input to computer 101. Examples of user input device 103 include, but are not limited to, a keyboard, a mouse, a touch-sensitive display or pad, a microphone, and/or a video camera. Likewise, user output device 104 may be used for receiving output from computer 101 and providing an indication of the output in a form that can be sensed by a human. Examples of user output device 104 include, but are not limited to, a display, a printer, and an audio speaker. Whenever user input and user output are described herein, such user input and user output may be provided, respectively, via user input device 103 and user output device 104.

Network 105 may serve to communicatively couple computer 101 with Sources 1, 2, and 3, and may be any type of network or combination of networks. Examples of network 105 include, but are not limited to, the Internet, an intranet, a local-area network (LAN), a landline telephone network, a satellite communication network, and a cellular telephone network or other type of wireless network. In other embodiments, computer 101 may be directly coupled to Sources 1, 2, and/or 3 without intervening network 105. In still further embodiments, data from Sources 1, 2, and/or 3 may be provided to computer 101 and/or to storage 102 in an alternative way, such as by delivery of the stored data on a computer-readable medium.

Sources 1, 2, and 3 may themselves also include a computer and storage. The computer at those sources may further include a web server (where network 105 includes the Internet). Sources 1, 2, and 3 may be used to provide data to be merged by computer 101. Non-limiting examples of Sources 1, 2, and 3 may include Internet Movie Database (IMDB) (www.imdb.com), All Movie Guide (AMG) (www.allmovie.com), and Tribune Media Services (TMS). Thus, in some embodiments, Sources 1, 2, and/or 3 may appear as web pages from the point of view of computer 101. Therefore, computer 101 may also be configured to execute a web browser and/or other software configured to communicate with the web pages generated by Sources 1, 2, and/or 3. In addition, while three sources are shown in this example, any plural number of sources may be used.

In operation, computer 101 may collect multiple data sets from Sources 1, 2, and/or 3, and store these data sets in storage 102. In the following discussions, the data set from Source 1 will be referred to as Data Set 1, the data set from Source 2 will be referred to as Data Set 2, and the data set from Source 3 will be referred to as Data Set 3. The various data sets may or may not be in a similar format. Once the data sets are fully collected (or in parallel with data set collection), computer 101 may merge some or all of these data sets to produce a merged data set. An example of how this merging may occur is described next with reference to FIGS. 2 and 5. Some or all of the steps described in connection with FIGS. 2 and 5 may be performed by, for example, computer 101.

Figure 2:
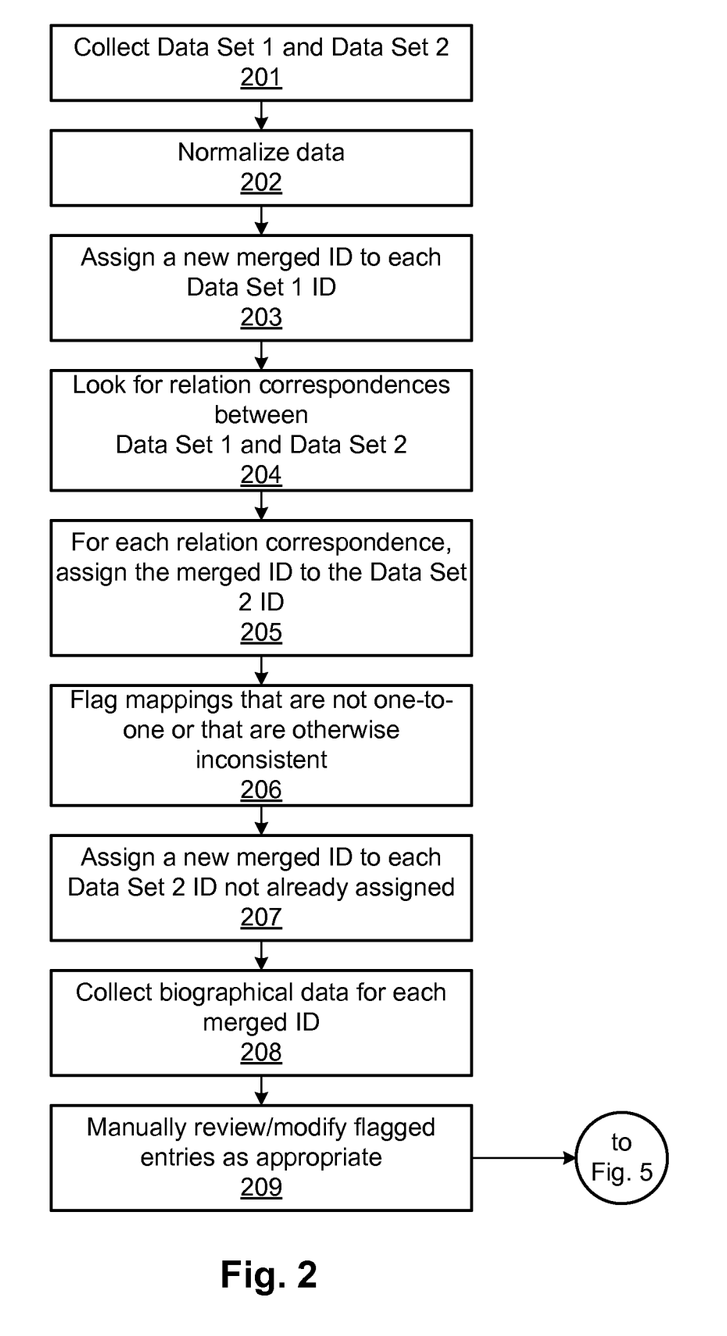
FIG. 2 is a flow chart showing illustrative steps that may be performed by the system of FIG. 1, for merging two data sets that provide unique identifiers for each person or other entity included therein.
Figure 3:
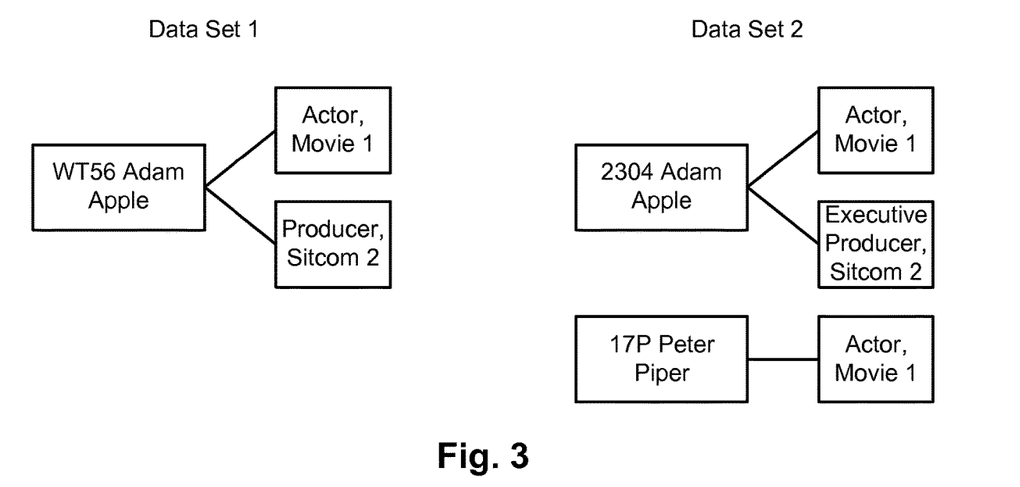
FIGS. 3 and 4 functionally show examples of data to be merged from two data sets, in connection with the process of FIG. 2.

Referring to FIG. 2, in step 201 computer 101 may collect Data Set 1 and Data Set 2, in preparation for merging of these two data sets. The data sets that are collected may be, for instance, the entire database of information provided by a data source such as a web site, or it may be a subset thereof. The collected data sets may be stored in storage 102. Each of the data sets, as stored in storage 102 and/or as provided by Sources 1 and 2, may associate people with television shows and their roles in those television shows. An example is shown in FIG. 3. In this example, Data Set 1 associates a person named "Adam Apple" with an identifier WT 56, with a Movie 1, and with a Sitcom 2, and further associates Adam Apple as being an actor in Movie 1 and a producer of Sitcom 2. Data Set 2 also associates "Adam Apple" with Movie 1 and Sitcom 2, and further associates Adam Apple as being an actor in Movie 1 and an executive producer of Sitcom 2.

The term "television show" as used herein is intended to broadly include any type of entertainment video product that was, is, or may be displayed on a television set. Examples of a television show include, but are not limited to, sitcoms or other television series such as soap operas and other dramatic series, movies (both theatrical and made-for-television movies), documentaries, commercials, news shows and coverage, sports shows, and sports events.

Returning to FIG. 2, in step 202, computer 101 may normalize the data in Data Sets 1 and/or 2. The purpose of normalizing the data in this example may be to cause the data from Data Sets 1 and 2 to be in the same or a similar format as each other. Another purpose may be to reduce the number of terms used in a data set. An example of this is also described with reference to FIG. 3. As shown in FIG. 3, while Data Set 1 associates Adam Apple as being a "producer" of Sitcom 2, Data Set 2 associates Adam Apple as being an "executive producer" of Sitcom 2. While these descriptions are not necessarily conflicting with each other, they are not identical. Therefore, it may be desirable to change the description in Data Set 2 to a more generic categorical term, such a "producer."

This type of normalization may be used for any terms in the data sets. Another example of such a hierarchy (where generic terms may replace more detailed terms) may include replacing "screenwriter" with "writer." Thus, in one example, it may be desirable to reduce all relational terms between the person and the television show to, for instance, "actor," "producer," "director," and "writer." As will be seen later, this normalization may make it easier to match or otherwise correspond person/television show relationships between data sets. In alternative embodiments, the data sets themselves may not be modified, and instead the comparison of relationships may take into account the various categories, such matching up, for instance, "screenwriter" with "writer" and "executive producer" with "producer."

In the present example, it is assumed that each person in Data Sets 1 and 2 has a unique associated identifier (ID). For example, referring to FIG. 3, in Data Set 1, Adam Apple is associated with the ID WT56, which uniquely identifies that person from all other persons in Data Set 1. The reason for this is that sometimes two different people may have the same name, and so such an ID that is unique within the data set is often used so that such people may be distinguished from each other. As another example, Data Set 2 may assign the ID 2304 to the same person, Adam Apple, in which that ID is unique to Data Set 2.

After normalization, in step 203 computer 101 assigns a new merged ID to each identifier in Data Set 1, which will be used in the merged data set to be created. The merged ID may be determined in any manner desired, such as canonically (e.g., in numerical sequential order such as 0001, 0002, 0003, etc.), randomly, or by parsing data from the person's entry in the source data set. In any event, each merged ID should be unique for that person within the merged data set. So, for example, Adam Apple with an ID of WT56 from Data Set 1 may become, in the new merged data set, Adam Apple with a merged ID of 0001. And, in the new merged data set, there will also be an association between merged ID 0001 and Data Set 1 ID WT56.

Next, in step 204, computer 101 compares Data Sets 1 and 2, in this case by searching for relation correspondences between Data Set 1 and Data Set 2. A relation defines the association between a person's name and a television show involving that person. For example, Data Set 1 shows a relation that Adam Apple is an Actor in Movie 1, and another a relation that Adam Apple is a producer of Sitcom 2. To determine corresponding relations, computer 1 may compare the relations between Data Set 1 and Data Set 2, and then determine whether they correspond to each other. In other words, it is determined whether a relation in Data Set 2 is the same as a relation in Data Set 1. This comparison may look for an exact match in some embodiments. In other embodiments, there may be other features that are used to see if the relations, while not producing an exact textual match, refer to the same association of the same person to the same television show. For instance, in the example of FIG. 3, there is an exact match between Data Sets 1 and 2 showing the relationship of Adam Apple being an actor in movie 1. However, as to Adam Apple's relationship with Sitcom 2, Data Set 1 indicates Adam Apple a producer and Data Set 2 indicates Adam Apple as an executive producer. If this categorization has not been previously normalized in step 202, then the comparison may have to take these differences into account and possibly determine that both relations are referring to the same association between person and television show. If this categorization has already been normalized, then it is likely in this example that Data Set 2 would have indicated Adam Apple as simply a "producer." In that case, there would be an exact match between those two associations.

Returning to FIG. 2, for each corresponding relation, in step 205 the source ID is associated with the merged ID that was already created for that person in step 203. Thus, in the example of FIG. 3, source ID 2304 would be associated with merged ID 0001 (which has also been previously associated with source ID WT56).

Figure 4:
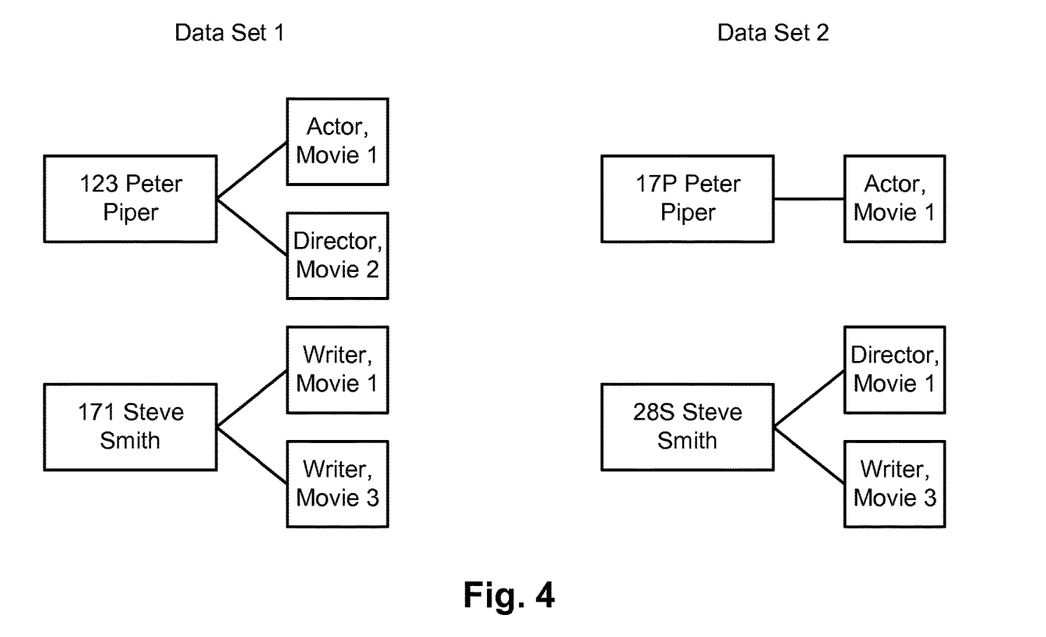

In step 206, mappings of relationships between Data Sets 1 and 2 that are not one-to-one (i.e., those that are one-to-plural or plural-to-one), or are otherwise inconsistent, are flagged in the new merged data set. For example, referring to FIG. 4, Data Set 1 shows Steve Smith only as a writer in Movie 1, and Data Set 2 shows Steve Smith only as a director of Movie 1. This difference may mean a variety of things. For instance, in actuality Steve Smith may be both an actor and a director in Movie 1, or alternatively one of Data Sets 1 or 2 is incorrect. In some embodiments, this difference may be considered an inconsistency and so the entry might be flagged in step 206. In other embodiments, the system may regard this as a case where Data Set 1 and Data Set 2 each contain information that the other does not. Thus, this example may not be considered an inconsistency at all.

In step 207, a new merged ID is then assigned to each ID of Data Set 2 that is not already assigned a new merged ID. In the example of FIG. 3, Data Set 2 also includes another person Peter Piper with an ID of 17P that is not included in Data Set 1. In this example, a new merged ID (such as 0002) would be added to the merged data set and associated with ID 17P. Thus, at the end of step 207, the new merged data set in this example would associate merged ID 0001 with source IDs WT56 and 2304, and associate merged ID 0002 with source ID 17P.

Next, in step 208, computer 101 adds biographical data for each merged ID, that is available from one or more of the source Data Sets 1 and/or 2. Biographical data may include, for instance, a description of the person's professional achievements and/or a description of the person's characteristics, personality, private life, etc. In some embodiments, the biographical data that is chosen for the merged data set may be taken from that source Data Set that is considered to be more reliable. In other words, Data Set 1 may be considered more reliable than Data Set 2, or vice versa. In further embodiments, the data set from which the biographical data is taken may be made on a case-by-case basis, such as based on the available biographical data itself (e.g., the longer and/or more complete biographical data may be used).

In step 209, those entries in the merged data set that were flagged in step 206 may be manually reviewed and/or modified, since those entries may be more likely to contain errors. Of course, any of the entries may be manually reviewed and/or modified, as desired. However, by flagging suspect entries, this may reduce the number of entries that would in practice be actually manually reviewed.

Figure 5:
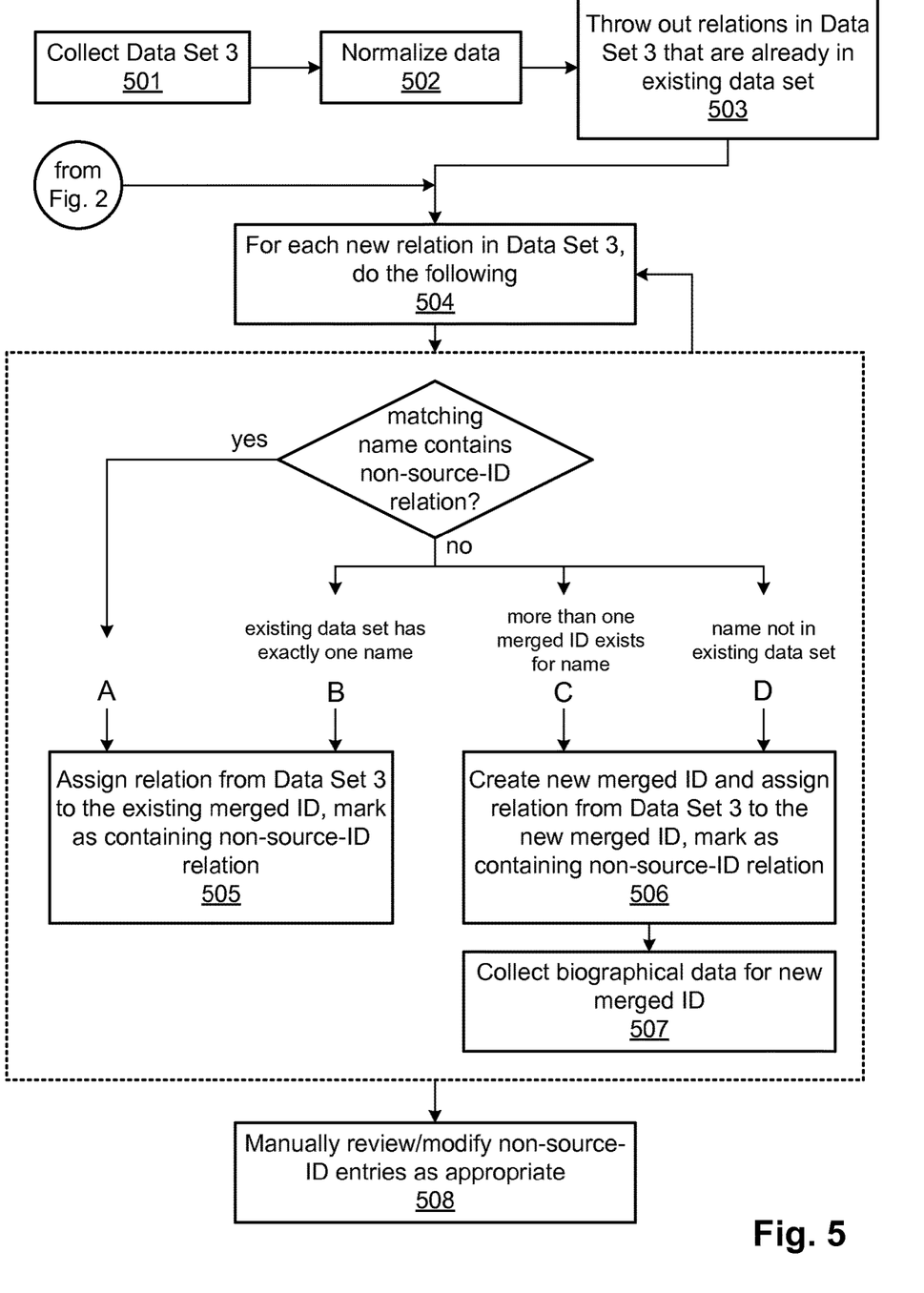
FIG. 5 is a flow chart showing illustrative steps that may be performed by the system of FIG. 1, for merging two data sets wherein at least one of the data sets does not provide a unique identifier for a person or other entity included therein.
Figure 6:
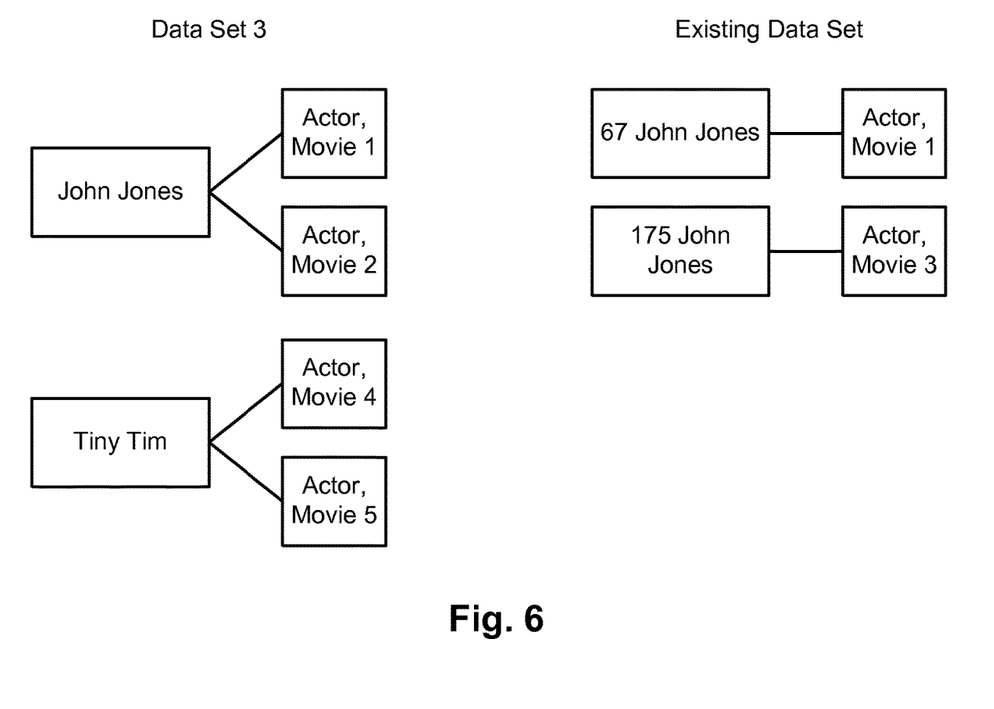
FIG. 6 functionally shows an example of data to be merged from a non-identifier data set with an existing data set, in connection with the process of FIG. 5.

FIG. 5 shows another example flowchart in which a data set (Data Set 3, in this case) is merged with another data set, wherein Data Set 3 does not include unique source IDs. For instance, in this example, Data Set 3 identifies each person by name only. In this example, there is more opportunity for errors and ambiguities. For example, FIG. 6 shows a situation where an ambiguity occurs. In the existing merged data set, there are two persons named John Jones, however in the existing merged data set, each instance of John Jones has its own merged ID (67 and 175, respectively) that distinguishes the two persons. Data Set 3 also has an entry for John Jones. However, it is not clear whether the John Jones of Data Set 3 should correspond to the John Jones associated with merged ID 67, the John Jones associated with merged ID 175, or a completely different John Jones. Based on the information provided, there is no way to know whether the John Jones in Data Set 3 is the same as either of the John Jones's of the existing merged data set.

Accordingly, it may be desirable to handle the merging of such a non-ID data set in a special manner. Also in this example, and as shown in the figures, the result of the process of FIG. 2 (i.e., the merged data set) may be used as an input to the process of FIG. 5. So, in this example, it will be assumed that Data Set 3 is being merged with the merged data set produced by the process of FIG. 2. However, it will be understood that the process of FIG. 5 may be used to merge any two or more data sets in which at least one of the data sets does not include unique IDs for the persons described therein, other than those persons' names.

In step 501, the data from Data Set 3 is collected, and in step 502 the data from Data Set 3 is normalized, in the same manner as in step 202. Then, in step 503, any relations in Data Set 3 that are already included in the existing merged data set are thrown out. For example, referring again to FIG. 6, the entry in Data Set 3 referring to John Jones being an actor in Movie 1 may be thrown out, because that relation is already included in the existing merged data set (specifically, the relation in the existing merged data set indicating that the John Jones having a merged ID of 67 is an actor in Movie 1). However, the relation of John Jones being an actor in Movie 2 would not be thrown out from Data Set 3 because that specific relation is not already included in the existing merged data set. As an alternative, rather than actually throwing out certain entries from Data Set 3, those entries in Data Set 3 that are redundant to the existing merged data set may be simply ignored for the remainder of the FIG. 5 process.

Next, step 504 is performed for each relation in Data Set 3 that is not already included in the existing data set (e.g., that is not already included in the merged data set from the process of FIG. 2). In the example of FIG. 6, the new relations in Data Set 3 would be the following three: John Jones being an actor in Movie 2; Tiny Tim being an actor in Movie 4; and Tiny Tim being an actor in Movie 5. For each new relation of Data Set 3, the following is performed using four possible situations A, B, C, and D, on a relation-by-relation basis. If the existing merged data set contains a matching or otherwise corresponding name to the name in the Data Set 3 relation, and that name in the existing data set is marked as containing a non-source-id-relation, then situation A is engaged. Otherwise, one of situations B, C, and D is engaged.

If the name in the Data Set 3 relation matches (or otherwise corresponds to) a name in the merged data set, and there is a merged ID associated with that name that is marked as containing non-source-id relations, then situation A is engaged, and step 505 is performed, in which the relation for the name in the Data Set 3 relation is assigned to the existing merged ID. In this particular example, there would not be more than one merged ID for a given name that is marked as containing non-source-ID relations.

Alternatively, if the name in the Data Set 3 relation matches (or otherwise corresponds to) exactly one name in the existing merged data set, then situation B is engaged and so step 505 is performed. That entry is marked in the merged data set as containing a non-source-ID relation.

Alternatively, if the name in the Data Set 3 relation matches (or otherwise corresponds to) multiple names in the merged data set, then situation C is engaged, causing step 506 to be performed, in which a new merged ID is created and associated with the name in Data Set 3 and the relation for that name in Data Set 3 is associated with the new merged ID. Alternatively, if the name in the Data Set 3 relation does not match (or otherwise correspond to) any name in the merged data set, then situation D is engaged, and so also step 506 is performed. In both situations C and D, that new merged ID is marked in the merged data set as containing a non-source-ID relation (e.g., by adding a flag value to that entry).

Also, after performing step 506 in situations C and D, then in step 507 the biographical data is collected from the respective Data Set 3 relation and associated with the respective merged ID.

After all of the new Data Set 3 relations have been processed in steps 505, 506, and/or 507, then in step 508, the merged data set may be made available for manual review and/or modification. It may be desired, for instance, that only those entries flagged as being from non-ID sources are manually reviewed and modified as appropriate. However, any of the entries may be reviewed and/or modified if desired.

Once the merged data set is created using the processes of FIGS. 2 and/or 5, it may be used as source data for electronic program guides (EPGs) implemented on users' television set-top boxes. Alternatively, the merged data set may be provided to viewers and/or content providers in any other form, such as via a web page on the Internet. The latter may be particularly useful where movies and other content are provided to viewers via the Internet rather than traditional television broadcast or cable television.

Thus, various examples have been provided that allow for the merging of two or more source data sets. A potential result of merging the source data sets is a merged data set that includes a subset of data from each of the source data sets. In particular, where each of the source data sets relates certain persons (or other entities) in roles with regard to certain television shows (or other events), then the merged data set may associate some of the names of the entities from one of the source data sets with some of the roles from another of the source data sets.

While these examples have been in the context of merging data sets relating people with television shows, the techniques described herein may be used in a variety of different data set contexts. For example, these examples may instead have used a different type of entity than a person, such as a corporation name, a sports team name, or the like. Additionally, these examples may instead have used a different type of event than a television show, such as an Internet-provided event (e.g., a movie provided to a viewer over the Internet), a sporting event, play, political debate, whether or not such events are televised. Also, it will be understood that movies in theatres may also be used rather than or in addition to those shown on television. Finally, while certain illustrative roles or relations have been described between the entities (e.g., persons) and events (e.g., television shows), other roles may be used as the content dictates. For example, where the event is a sporting event, then the entity may be a sports player and the role or relation of the sports player to the sporting event may be the position played on the team, or whether that person was a coach or team owner, etc.

The invention claimed is:
1. A method comprising:
receiving, by a computer, a plurality of entries, each comprising:
an identifier;
a name of a person associated with a content item;
a role of the person in the content item; and
a title of the content item;
determining, by the computer, that a first entry of the plurality of entries and a second entry of the plurality of entries are a matching pair of entries, wherein the determining is based on a correspondence between the first entry and the second entry;

determining reliability of the first entry and the second entry based on a quantity of information in the first entry is more than a quantity of information in the second entry;

selecting, for a new entry and based on the reliability of the first entry and the second entry, a name, role, or title in the first entry over a name, role, or title in the second entry; and storing, in a computer-readable medium and with the plurality of entries, the new entry associated with the matching pair of entries, wherein the new entry comprises a new identifier, the identifier of the first entry, and the identifier of the second entry.

2. The method of claim 1, wherein the content item comprises a television show.

3. The method of claim 1, further comprising determining that the second entry has a correspondence that is one-to-plural or plural-to-one correspondence with the first entry.

4. The method of claim 1, further comprising:
determining that a third entry does not match any other entry in the plurality of entries;
adding, to the plurality of entries, a second new entry corresponding to the third entry,
wherein the second new entry comprises:
a new identifier; and
a third identifier associated with the third entry.

5. The method of claim 1, wherein, for the first entry, the content item comprises a television show and the role comprises an actor or actress.

6. The method of claim 1, further comprising: generating a second new identifier for the new entry different from a first identifier associated with the first entry.

7. The method of claim 1, wherein the new identifier is different from the identifier of the first entry and the identifier of the second entry.

8. The method of claim 1, further comprising:
flagging identifiers associated with entries, of the plurality of entries, that match two or more other entries of the plurality.

9. The method of claim 1, further comprising:
using at least a part of the new entry to generate an electronic program guide; and
sending, by the computer, the electronic program guide to a plurality of users.

10. The method of claim 1, further comprising:
generating a web page comprising at least a part of the new entry; and
providing, by the computer, the web page to one or more visitors via a network.

11. The method of claim 1, wherein the identifier of the first entry and the identifier of the second entry in the matching pair of entries are generated from different sources.

12. The method of claim 1, further comprising:
causing a user device to display a program listing comprising the new entry;
receiving, from the user device, a request for a particular content item;
initiating a streaming session of the requested particular content item; and
sending, to the user device, the requested particular content item.

13. The method of claim 1, further comprising:
normalizing the first entry and the second entry to be in a same format.

14. A method comprising:
receiving, by a computer, a first data set comprising:
a first entry comprising a name of a person associated with a first content item, a role of the person in the first content item, and a title of the first content item; and
a first identifier associated with the first entry, wherein the first identifier is different from other identifiers of other entries in the first data set;
receiving, by the computer, a second data set comprising:
a second entry comprising a name of a person associated with a second content item, a role, in the second content item, of the person associated with the second content item, and a title of the second content item; and
a second identifier associated with the second entry, wherein the second identifier is different from other identifiers of other entries in the second data set;
generating, by the computer, a third identifier, and associating the third identifier with the first identifier, wherein the third identifier is different from the first identifier;
determining, by the computer, that the first entry and the second entry are a matching pair of entries, wherein the determining is based on a correspondence between the first entry and the second entry;
determining reliability of the first entry and the second entry based on a quantity of information in the first entry is more than a quantity of information in the second entry;
after the determining the reliability, selecting, by the computer, for a third entry for a third data set, and based on the reliability of the first entry and the second entry, a name, role, or title in the first entry over a name, role, or title in the second entry, the third entry comprising the third identifier, the second identifier, and the first identifier; and
storing the third entry in a computer-readable medium.

15. The method of claim 14, wherein the first and second content items comprise television shows.

16. The method of claim 14, wherein the first identifier and the second identifier are generated from different sources.

17. The method of claim 14, further comprising:
causing a user device to display a program listing comprising the third entry;
receiving, from the user device, a request for a particular content item;
initiating a streaming session of the requested particular content item; and
sending, to the user device, the requested particular content item.

18. A method comprising:
receiving, by a computer, a first data set comprising a plurality of entries corresponding to a plurality of content items, wherein each of the entries in the first data set:
indicates a name of a person, a role of the person in a corresponding content item, and a title of the corresponding content item; and
comprises an identifier;
receiving, by the computer, a second data set comprising a plurality of entries corresponding to a plurality of content items, wherein each of the entries in the second data set:

indicates a name of a person, a role of the person in a corresponding content item, and a title of the corresponding content item; and
comprises an identifier;
determining, by the computer and for each entry of the first data set, a corresponding merged entry identifier;
determining, by the computer and based on the second data set, a plurality of correspondences with entries of the first data set, and for each correspondence, assigning a corresponding merged identifier to a corresponding entry identifier from the second data set;
determining reliability of the first data set and the second data set based on a quantity of information in the first data set is more than a quantity of information in the second data set; and
generating, by the computer, a merged data set comprising entries that indicate correspondences between entries of the first data set and entries of the second data set, wherein the merged data set is generated based on the reliability of the first data set and the second data set, such that at least one of a first name, a first role, or a first title in the first data set is selected in the merged data set over a second name, a second role, or a second title in the second data set.

19. The method of claim 18, further comprising:
prior to generating the merged data set, determining entries that indicate one-to-plural or plural-to-one correspondences between entries of the first data set and entries of the second data set; and
flagging the entries, in the merged data set, that indicate one-to-plural or plural-to-one correspondences.

20. The method of claim 18, further comprising:
determining, in the merged data set, a subset of entries that indicate correspondences between pairs of entries, of the first data set and of the second data set, in which the role of the person is different; and
updating the merged data set to indicate the subset of entries as an inconsistency record.

21. The method of claim 18, further comprising marking each entry, of the merged data set, that is derived from the second data set.

22. The method of claim 18, wherein, for one of the plurality of entries of the first data set, the corresponding content item comprises a television show and the role of the person comprises an actor or an actress.

23. The method of claim 18, further comprising indicating that an entry of the merged data set does not have an identifier of the second data set.

24. The method of claim 18, wherein the merged data set comprises identifiers from different sources.

25. The method of claim 18, further comprising:
causing a user device to display a program listing comprising the merged data set;
receiving, from the user device, a request for a particular content item;
initiating a streaming session of the requested particular content item; and
sending, to the user device, the requested particular content item.

26. A method comprising:
receiving, by a computer, a first identifier associated with first data indicating a name of a first person, a title of a first content, and a role of the first person in relation to the first content;
receiving, by the computer, a second identifier associated with second data indicating a name of a second person, a title of a second content, and a role of the second person in relation to the second content;
determining that the first data and the second data are a matching pair of data, wherein the determining is based on a correspondence between the first data and the second data;
determining reliability of the first data and the second data based on a quantity of information in the first data is more than a quantity of information in the second data;
selecting, by the computer, for third data and based on the reliability of the first data and the second data, a name, role, or title in the first data over a name, role, or title in the second data, the third data comprising a third identifier, the first identifier, and the second identifier; and
storing, by the computer, the third data in a computer-readable medium.

27. The method of claim 26, further comprising comparing the name of the first person, the title of the first content, and the role of the first person with the name of the second person, the title of the second content, and the role of the second person, respectively, to determine whether the first data corresponds to the second data.

28. The method of claim 27, further comprising:
after a determination that the role of the second person is an executive producer, changing the role of the second person from the executive producer to a producer.

29. The method of claim 26, wherein the first identifier and the second identifier are generated from different sources.

30. The method of claim 26, further comprising:
causing a user device to display a program listing comprising the third data;
receiving, from the user device, a request for a particular content item;
initiating a streaming session of the requested particular content item; and
sending, to the user device, the requested particular content item.

* * * * *

UNITED STATES PATENT AND TRADEMARK OFFICE
CERTIFICATE OF CORRECTION

| | |
|---|---|
| PATENT NO. | : 11,531,668 B2 |
| APPLICATION NO. | : 12/344713 |
| DATED | : December 20, 2022 |
| INVENTOR(S) | : Rubinoff |

It is certified that error appears in the above-identified patent and that said Letters Patent is hereby corrected as shown below:

In the Specification

Column 5, Detailed Description, Line 36:
Delete "1" and insert --101-- therefor

Signed and Sealed this
Sixteenth Day of April, 2024

Katherine Kelly Vidal
Director of the United States Patent and Trademark Office